Patented May 30, 1939

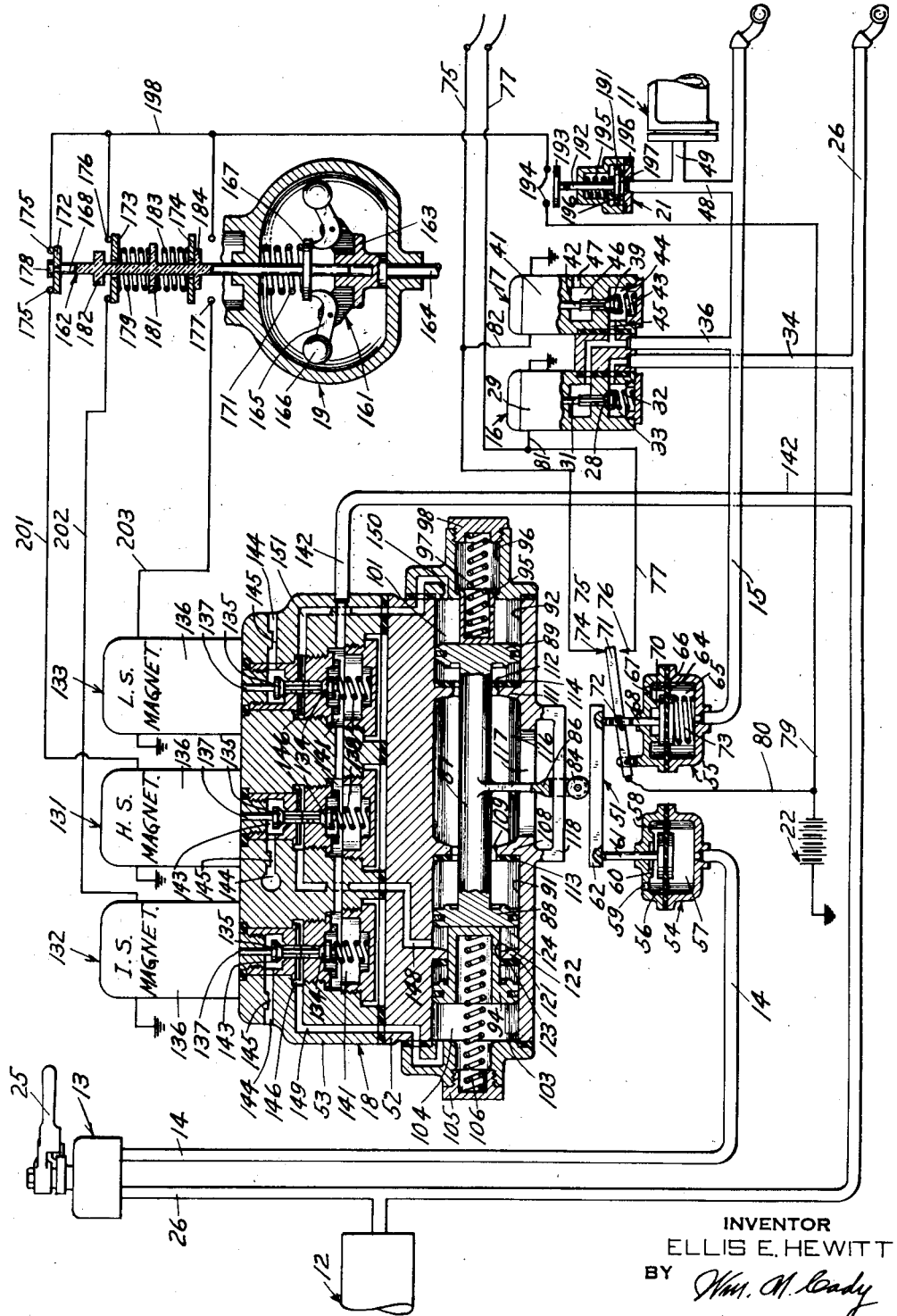

2,160,207

UNITED STATES PATENT OFFICE 2,160,207

SPEED CONTROLLED BRAKE

Ellis E. Hewitt, Edgewood, Pa., assignor to The Westinghouse Air Brake Company, Wilmerding, Pa., a corporation of Pennsylvania Application July 16, 1937, Serial No. 153,912

18 Claims. (Cl. 303—21)

This invention relates to speed-controlled brakes, that is, to vehicle brake systems in which the degree of application of the brakes is automatically controlled according to the speed of the vehicle.

It is an object of my invention to provide a speed-controlled brake control equipment of the character described and claimed in my copending prior Patent 2,140,624, application for which was filed June 30, 1936, and assigned to the same assignee as the present application, but possessing certain differences in structure to be hereinafter pointed out.

More specifically, it is an object of my invention to provide a novel mechanism for automatically causing the degree of braking force initially established to be in accordance with the speed of the vehicle at the time the application is initiated and, thereafter, for automatically effecting, in succession, a plurality of reductions in the braking force as the speed of the vehicle reduces into successively lower speed zones or speed ranges.

The above objects and other objects of my invention which will be made apparent hereinafter are attained by the vehicle brake control equipment shown in the single figure of the accompanying drawing which illustrates one embodiment of my invention.

DESCRIPTION OF EQUIPMENT

Referring to the single figure of the drawing, the equipment shown comprises a brake cylinder 11, a source of fluid pressure such as a main reservoir 12, a brake valve device 13, a control pipe 14 the pressure in which is under the control of the brake valve device 13, a straight-air pipe 15 the fluid pressure in which controls the fluid pressure in the brake cylinder 11, an application magnet valve device 16, a release magnet valve device 17, a control valve mechanism 18 for controlling the application and release magnet valve devices 16 and 17, a speed-controlled or governor switch device 19 for controlling the control valve mechanism 18, a pressure switch device 21 which functions cooperatively with the governor switch device 19 in the control of the control valve mechanism 18, and a source of electrical energy, such as a battery 22.

Considering the parts of the equipment in greater detail, the brake valve device 13 is illustratively shown as of a simple rotary type having a rotary valve, not shown, within the casing thereof which is operated by a handle 25. The handle 25 is normally in a release or running position and is operative to a service application position, an emergency application position, and a lap position, in the well known manner of brake valve devices. With the handle 25 in release position, the rotary valve establishes communication whereby the control pipe 14 is connected to atmosphere. With the handle 25 in service application position, fluid under pressure is supplied from the main reservoir 12 through a pipe 26, hereinafter called the main reservoir pipe, to the control pipe 14 at a service rate. When it is desired to effect a service application of the brakes, the operator maintains the handle 25 in the service application position to establish a pressure in the control pipe 14 corresponding to the desired degree of braking force, and then shifts the handle to lap position in which the communicattion between the main reservoir pipe 26 and control pipe 14 is closed as well as the atmospheric communication between the control pipe and atmosphere.

If it is desired to effect an emergency application of the brakes, the operator turns the handle 25 to emergency position to correspondingly shift the rotary valve of the brake valve device to cause communication to be established through which fluid under pressure is supplied from the main reservoir pipe 26 to the control pipe 14 at an emergency rate, the ultimate pressure attained therein corresponding to the pressure of the fluid as supplied from the main reservoir. If desired, any suitable type of feed valve device may be provided whereby the maximum pressure established in the control pipe 14 in an emergency application of the brakes is limited to a pressure lower than the pressure in the main reservoir 12.

The application magnet valve device 16 and the release magnet valve device 17 may be embodied in a single casing, as shown, or they may be embodied in separate casings. The application magnet valve device 16 comprises a supply valve 28 and an electromagnet 29 effective, when energized, to actuate a plunger 31 to unseat the supply valve 28 from a normal seated position against the yielding resistance of spring 32. The supply valve 28 is contained in a chamber 33 which is constantly connected to a source of fluid pressure, such as the main reservoir pipe 26, through a branch pipe and passage 34. When the electromagnet 29 is energized and the supply valve 28 correspondingly unseated, communication is established between the chamber 33 and a chamber 35 which is connected to the straight-air pipe 15 through a branch pipe and passage 36.

The release magnet valve device 17 comprises a release valve 39 and an electromagnet 41 effective, when energized, to actuate a plunger 42 to unseat the release valve 39 from an associated valve seat against the yielding resistance of a coil spring 43. The release valve 39 is contained in a chamber 44 which is constantly connected through a branch passage 45 to the passage and pipe 36 leading to the straight-air pipe 15. When the release valve 39 is unseated, it establishes communicattion between the chamber 44 and a chamber 46 which is constantly open to atmosphere through an exhaust port 47.

Thus, when the release valve 39 is seated and the supply valve 28 is unseated, fluid under pressure may be supplied from the main reservoir pipe 26 to the straight-air pipe 15 and to the brake cylinder 11, which may be connected to the straight-air pipe as through a branch pipe 48 and another pipe 49.

When the supply valve 28 is seated and the release valve 39 is unseated, the supply of fluid under pressure to the straight-air pipe 15 is cut off and the fluid under pressure in the straight-air pipe 15 and brake cylinder 11 is vented to atmosphere through the exhaust port 47 of the release magnet valve device 17.

The control valve mechanism 18 comprises a control switch portion 51, including a pressure-responsive device 54 and a pressure-responsive switch device 55, a pneumatic cylinder portion 52 and a magnet valve portion 53. The pressure-responsive device 54 comprises a casing in which is suitably contained a movable abutment, such as a diaphragm 56, having a chamber 57 at one side thereof to which the control pipe 14 is connected. At the opposite side of the diaphragm 56 is a chamber 58 constantly open to atmosphere through a port 59 in the casing. A downwardly projecting annular stop 60 on the casing in chamber 58 limits the extent of upward movement of diaphragm 56. Suitably attached to the diaphragm 56 is a stem 61 which extends upwardly through the casing and which is provided at the exterior end thereof with a knife edge which is received in a suitable V-shaped groove at one end of a lever 62.

Pressure-responsive switch device 55 comprises a casing in which is suitably contained a movable abutment, such as a diaphragm 64, which is preferably of the same effective pressure area as the diaphragm 56. At one side of diaphragm 64 is a chamber 65 to which the straight-air pipe 15 is constantly connected, and at the other side is a chamber 66 which is constantly open to atmosphere through a port 67. The ports 59 and 67 of the pressure-responsive devices 54 and 55 serve to prevent dash-pot action of the diaphragms 56 and 64. Suitably secured to the diaphragm 64 is a stem 68 which extends upwardly through an opening in the casing and has a knife edge at the exterior end thereof which is received in a cooperating V-shaped recess in the end of the lever 62 opposite to the end supported by the stem 61 of the pressure-responsive device 54.

A switch arm 71 is pivoted at one end on an upstanding lug of the casing of the pressure-responsive switch device 55 and is provided at a point intermediate the ends thereof with an elongated opening for receiving a pin 72 which is secured to an insulated portion of the stem 68.

Contained in the chamber 65 and interposed between the diaphragm 64 and the casing is a coil spring 73 which normally shifts the diaphragm 64 upwardly into engagement with a downwardly projecting annular stop 70 formed on the casing in chamber 66. In this position of the diaphragm 64, the switch arm 71 is raised to an upper position in which it engages a fixed contact finger 74 to which is connected a train wire 75. When the stem 68 and diaphragm 64 are shifted downwardly against the force of the spring 73, the switch arm 71 is correspondingly shifted so that it disengages the contact finger 74 and engages a contact finger 76 to which a train wire 77 is connected.

The switch arm 71 is connected to one terminal, hereinafter called the positive terminal, of the battery 22 as by a wire 79 and a branch wire 80. One terminal of the electromagnet 29 of the application magnet valve device 16 is connected by a branch wire 81 to the wire 77, hereafter referred to as the application wire, and the other terminal is connected to the negative terminal of the battery 22 as through a ground connection in the manner shown or through a return wire, not shown. One terminal of the electromagnet 41 of the release magnet valve device 17 is connected by a branch wire 82 to the train wire 75, hereinafter referred to as the release wire, and the other terminal of the electromagnet is connected as through a ground connection, in the manner indicated, to the negative terminal of the battery 22.

It will thus be apparent that in the normal position of the switch arm 71 the electromagnet 41 of release magnet valve device 17 is energized and that the electromagnet 29 of the application magnet valve device 16 is deenergized, thereby causing the supply valve 28 and the release valve 39 to be seated and unseated, respectively, to reduce the pressure in the straight-air pipe 15 to atmospheric pressure and thus effect release of the brakes.

When the switch arm 71 engages the contact finger 76, the circuit for energizing the electromagnet 41 of release magnet valve device 17 is interrupted and the circuit for energizing the electromagnet 29 of the application magnet valve device 16 is completed so that the supply valve 28 and the release valve 39 are unseated and seated, respectively, to cause fluid under pressure to be supplied to the straight-air pipe 15 and brake cylinder 11 to effect application of the brakes.

Operation of the pressure-responsive switch device 55 is effected according to the supply of fluid under pressure to and the release of fluid under pressure from the chamber 57 of the pressure-responsive device 54 through the medium of the lever 62. As will be apparent, the upper edge or face of the lever 62 cooperatively engages a fulcrum roller 84 which is shiftable to different positions in a manner to be presently described. It will be seen that upon the supply of fluid under pressure to the chamber 57 at one side of the diaphragm 56 of the pressure-responsive device 54, the stem 61 is urged upwardly and thus causes the lever 62 to pivot in a clockwise direction on the fulcrum roller 84 to exert a downward force on the stem 68 of the pressure-responsive switch device 55. When the force exerted downwardly on the stem 68 is sufficient to overcome the relatively lightly tensioned return spring 73, the switch arm 71 disengages contact finger 74, thus causing deenergization of the electromagnet 41 of release magnet valve device 17 and seating of the release valve 39. As the pressure in the chamber 57 of the pressure-responsive device 54 increases further, the force acting downwardly on the stem 68 is increased further and the switch arm 71 is correspondingly shifted further downwardly into engagement with the contact finger 76 to effect energization of the electromagnet 29 of the application magnet valve device 16. Fluid under pressure is thus supplied to the straight-air pipe 15 and brake cylinder 11.

The upward movement of the diaphragm 56 in the pressure-responsive device 54 is limited by the engagement of the diaphragm with downwardly projecting annular stop 60 and thus regardless of the pressure established in the chamber 57, the switch arm 71 is moved downwardly merely sufficiently to effect positive contact with the contact finger 76.

As the pressure builds up in the straight-air pipe 15 and in the brake cylinder 11, the pressure acting in the chamber 65 of the pressure-responsive switch device 55 exerts a force upwardly on the diaphragm 64 and stem 68 tending to pivot the lever 62 in the opposite or counterclockwise direction. Accordingly, it will be seen that when the pressure in the chamber 65 and the force of the spring 73 becomes sufficient, the stem 68 is returned upwardly and the switch arm 71 correspondingly disengaged from the contact finger 76. Since the supply valve 28 of the application magnet valve device 16 is thus immediately reseated to cut off the further supply of fluid under pressure to the straight-air pipe 15, no further increase in the pressure in the straight-air pipe 15 occurs and, consequently, the switch arm 71 remains in a neutral or centered position out of engagement with either of the contact fingers 74 and 76.

It will be apparent that with the fulcrum roller 84 at a point between and equi-distant from the knife edges on the stems 61 and 68, the pressure established in the straight-air pipe 15 and brake cylinder 11 will be substantially equal to the pressure established in the control pipe 14 and chamber 57 of the pressure-responsive device 54.

If the fulcrum roller 84 is shifted in the right-hand direction, the pressure established in the straight-air pipe for a given pressure in the control pipe 14 and chamber 57 will vary substantially in proportion to the variation in the ratio between the moment arm of the stem 61 and the moment arm of the stem 68. For example, if the fulcrum roller 84 is shifted in the right-hand direction to a position such that the moment arm of the stem 61 is three units of measure, and the moment arm of the stem 68 is two units of measure, then the pressure established in the straight-air pipe 15 will be to the pressure established in control pipe 14 and chamber 57 in the ratio of three to two.

Similarly, if the fulcrum roller 84 is shifted in the left-hand direction from the mid-position in which it is shown in the drawings, so that the moment arm of the stem 61 becomes less than the moment arm of stem 68, then the pressure established in the straight-air pipe 15 will be to the pressure established in the control pipe 14 in the ratio of the moment arm of the stem 61 to the moment arm of the stem 68, that is, a fraction of the pressure in the control pipe 14.

The fulcrum roller 84 is carried on a tongue 86 projecting laterally from a shaft or rod 87 which is slidably supported at the opposite ends thereof by and which connects two movable abutments or pistons 88 and 89 that operate in separate bores 91 and 92 of the cylinder portion 52 of the control valve mechanism 18.

Normally, shaft 87 is centered in the position shown wherein the fulcrum roller 84 is mid-way between the stems 61 and 68 of the devices 54 and 55 by means of a piston stop element 94 acting on the piston 88 and a spring-biased stop 95 acting in the opposite direction on the piston 89.

The stop element 95 is in the shape of a hollow cylinder closed at one end and having an outwardly extending flange at the opposite end which operates slidably in a bore 96 in the casing. A coil spring 97, interposed between the inner face of the closed end of the stop element 95 and a screw plug 98 closing the open end of the bore 96, urges the stop element 95 in the left-hand direction until the flange on the stop element engages an inwardly extending shoulder at the inner end of the bore 96. The stop element 95 extends into a chamber 101 formed at the right-hand side of the piston 89 and engages the piston 89 so that with the stop element 95 shifted to the extreme limit of its movement in the left-hand direction, the piston 89 and the shaft 87 are positioned in a neutral position wherein the fulcrum roller 84 is mid-way between the stems 61 and 68 of the devices 54 and 55.

The piston stop element 94 operates in a bore 103 and a chamber 104 is formed at the left-hand side of the piston stop element 94. Contained in the chamber 104 and interposed between the stop element 94 and a screw plug 105 in the casing is a spring 106 which urges the piston stop element 94 in the right-hand direction. The stop element 94 has on the side thereof opposite to chamber 104 a longitudinally projecting portion of reduced diameter which engages the piston 88. The spring 97 urging the piston 89 in the left-hand direction is slightly stronger than the spring 106 urging the piston 88 in the right-hand direction, and thus spring 106 shifts the pistons 88 and 89 and shaft 87 in the right-hand direction only to the limit permitted by the extreme left-hand position of the stop element 95.

Formed at a suitable position to the right of the piston 88 is an annular shoulder 108 having a central opening 109 and formed at a suitable position to the left of the piston 89 is a similar annular shoulder 111 having a central opening 112, the shaft 87 being smaller in diameter than the openings 109 and 112 and extending centrally therethrough. Suitably secured to the annular shoulder 108 is a gasket seat 113 on which the piston 88 is adapted to seat when it is shifted a predetermined distance in the right-hand direction from the neutral position shown. In a similar manner, a suitable gasket seat 114 is provided on the annular shoulder 111 on which the piston 89 is adapted to seat when shifted a predetermined distance in the left-hand direction from the neutral position shown.

Formed between the annular shoulders 108 and 111 is a chamber 116 which is constantly open to atmosphere through an elongated opening 117 through which the tongue 86 carrying the fulcrum roller 84 extends and which permits slidable movement of the tongue 86 therein according to the movement of the shaft 87.

A suitable guide 118 may be formed on or attached to the casing of the cylinder portion 52, in the manner shown, so as to support the fulcrum roller 84 and reduce the wear on the pistons 88 and 89 as well as on the walls of the bores 91 and 92 in which the pistons operate due to the forces exerted on the tongue 86 by pressure devices 54 and 55.

Formed between the piston 88 and the piston stop element 94 is an annular shoulder 121 which is provided with a central opening 122 through which the reduced portion of the stop element 94 extends. Suitably carried on the shoulder 121 is an annular gasket seat 123 on which the piston stop element 94 is adapted to seat when shifted a selected distance in the right-hand direction from the normal position shown.

Formed between the piston 88 and the annular shoulder 121 is a chamber 124 to and from which fluid under pressure may be supplied and released in the manner to be presently described.

The magnet valve portion 53 of the control valve mechanism 18 comprises three magnet valve devices 131, 132 and 133 hereinafter respectively designated the high speed magnet, the intermediate speed magnet and the low speed magnet, arranged to control the supply of fluid under pressure to and the release of fluid under pressure from the chambers 124, 104 and 101 of the cylinder portion 52, respectively.

Each of the magnet valve devices 131, 132 and 133 comprises a pair of oppositely seating valves 134 and 135 and an electro-magnet 136 effective when energized to actuate a plunger or stem 137 to shift the valves 134 and 135 to unseated and seated positions, respectively, against the yielding resistance of a spring 138. When the electro-magnet 136 is deenergized, the spring 137 shifts the valves 134 and 135 to seated and unseated positions, respectively.

Each valve 134, hereinafter designated supply valve 134, is contained in a corresponding chamber 141 and all the chambers 141 are connected to a branch passage and pipe 142 which is connected to the main reservoir pipe 26. Each valve 135 hereinafter designated release valve 135, is contained in a corresponding chamber 143 which is constantly open to atmosphere through a port or passage 144 having a restricted passage 145 therein.

The valves 134 and 135 have fluted stems which meet in end-to-end contact within a chamber 146 that is located between the chambers 141 and 143. Chamber 146 of the high speed magnet 131 is connected to the chamber 124 of the cylinder portion 52 through a passage 148, chamber 146 of the intermediate speed magnet 132 is connected to the chamber 104 through a passage 149, and the chamber 146 of the low speed magnet 133 is connected to the chamber 101 through a passage 151 having a restricted portion 150.

It will thus be apparent that when the release valves 135 of the magnet valve devices 131, 132 and 133 are unseated and the supply valves 134 are seated as shown in the drawing, the chambers 124, 104 and 101 are vented to atmosphere. It will also be apparent that when the release valves 135 of the magnet valve device 131, 132 and 133 are seated and the supply valves 134 are unseated, the chambers 124, 104 and 101 are respectively charged with fluid under pressure as supplied from the main reservoir pipe 26.

The governor switch device 19, which serves to control energization and deenergization of the magnet valve device 131, 132 and 133 in the manner to be presently described, comprises a centrifuge device 161 which is operated according to the speed of travel of the vehicle and which controls the position of a switch element 162 that in turn, controls the circuits of the magnet valve devices 131, 132 and 133. Briefly, the centrifuge device 161 comprises a rotary element 163 which is suitably journaled in the casing of the governor device 19 and rotated, as through a shaft 164 that is in turn driven as through an endless belt or gear drive from a vehicle axle or other device on the vehicle rotating according to the speed of travel of the vehicle. Pivotally carried on the rotary element 163 are a plurality of levers 165, which are weighted at the outer ends thereof, as by fly-balls or other suitable weights affixed thereto, the inner ends of the levers 165 cooperatively engaging the lower face of a collar or flange 166 fixed on a stem 168 slidable in the casing. As the speed of the vehicle and accordingly of the rotary element 163 of the centrifuge device 161 increases, the fly-balls 166 move radially outward due to centrifugal force and the inner ends of the levers 165 thus exert a force to shift the stem 168 upwardly against the resisting force of a coil spring 171 interposed between the casing and the upper face of the flange 167 on the stem 168.

Carried on the stem 168 are three contact-bridging members 172, 173 and 174, which are arranged to engage, in circuit-closing relation, respective pairs of spaced insulated contact fingers 175, 176 and 177. The contact-bridging members 172, 173 and 174 are insulated from each other as by having the stem 168 of insulating material in the manner shown, and may be of strap or disc form with a central opening therein. The contact-bridging member 172 is fitted over the reduced threaded upper end of stem 168 and secured to the stem as by a nut 178. The contact-bridging member 173 is arranged with the stem 168 extending through the central opening therein, and a coil spring 179 concentric with the stem 168 is interposed between the contact-bridging member 173 and a fixed stop or flange 181 on the stem to urge the contact-bridging member 173 slidably along the stem in the direction of another fixed stop or flange 182. In a similar manner, the contact-bridging member 174 is arranged with the stem 168 extending through the central opening thereof and a coil spring 183 is interposed between the flange 181 of the stem and contact-bridging member 174 for yieldingly urging the contact-bridging member 174 slidably along the stem into engagement with a fixed flange or stop 184, on the stem.

The arrangement of the contact-bridging members 172, 173 and 174 on the stem 168 and the disposition of the pairs of contact fingers 175, 176 and 177 is such that when the vehicle or train is traveling at or above a certain uniform high speed, such as sixty miles per hour, the stem 168 is raised sufficiently to cause the contact-bridging members 172 and 173 to engage their respective contact fingers 175 and 176 and to cause the contact-bridging member 174 to disengage its associated contact fingers 177.

When the speed of the vehicle or train reduces below the certain uniform high speed of sixty miles per hour, the stem 168 is lowered so as to cause the contact-bridging member 172 to disengage the contact fingers 175. However, due to the fact that the coil spring 179 was compressed upon engagement of the contact-bridging member 173 with its associated contact fingers 176, the spring 179 continues to maintain the contact-bridging member 173 in contact with its associated contact fingers 176, as the speed of the vehicle or train reduces from the certain uniform high speed of sixty miles per hour. At the same time, the contact-bridging member 174 continues to be raised out of engagement with its associated contact fingers 177.

When the speed of the vehicle or train reduces below an intermediate uniform speed, such as thirty-five miles per hour, the flange 182 on the stem 168 engages contact-bridging member 173 and thus, as the stem 168 is lowered, it causes member 173 to be disengaged from its associated contact fingers 176. However, contact-bridging member 174 is still raised out of engagement with its associated contact fingers 177 and remains so as the speed of the vehicle or train further reduces.

When the speed of the vehicle or train reduces to a certain uniform low speed such as fifteen miles per hour, the stem 168 is lowered sufficiently that the contact-bridging member 174 engages its associated contact fingers 177 in circuit-closing relation.

As the speed of the vehicle or train reduces below the uniform low speed of fifteen miles per hour, the spring 183 is compressed and the contact-bridging member 174 thus moves slidably along the stem 168 away from the stop flange 184 so that, as the stem 168 continues to be lowered after the initial engagement of the contact-bridging member 174 with its associated contact fingers 177, the contact-bridging member 174 remains in engagement with its associated contact fingers.

The pressure switch 21 is of any suitable type and is illustrated diagrammatically as comprising a casing containing a piston 191 having a stem 192 carrying in insulated relation thereon a contact-bridging member 193 for engaging in circuit-closing relation a pair of spaced insulated contact fingers 194. At one side of the piston 191 is a coil spring 195 which yieldingly urges the piston 191 downwardly into seated relation on an annular rib seat 196, in which position the contact-bridging member 193 on the stem 192 is out of engagement with the contact fingers 194. At the side of the piston 191 opposite to the spring 195 is a chamber 197 to which fluid under pressure is supplied whenever application of the brakes is initiated. For example, the chamber 197 is shown as connected to the branch pipe 48 of the straight-air pipe 15.

One of the contact fingers 194 of the pressure switch 21 is connected to the positive terminal of the battery 22 by the wire 79, and the other contact finger is connected, as by wire 198, to one contact finger 175, one contact finger 176, and one contact finger 177 of the governor switch device 19. The remaining contact fingers 175, 176 and 177 are connected by wires 201, 202 and 203, respectively, to corresponding terminals of the electro-magnets of the high speed magnet 131, intermediate speed magnet 132, and low speed magnet 133, and the opposite terminals of the electro-magnets of the magnet valve devices 131, 132 and 133 are connected to the negative terminal of the battery 22, as through a ground connection in the manner shown.

It will thus be apparent that the magnet valve devices 131, 132 and 133 are normally deenergized, because with the brakes released, the pressure switch 21 is actuated to circuit-opening position.

It will also be apparent that if the pressure switch 21 is in circuit-closing position, the high speed magnet 131, the intermediate speed magnet 132 and the low speed magnet 133 are energized only when the contact-bridging members 172, 173 and 174, respectively, of the governor switch device 19 are in circuit-closing position.

Accordingly, if it is assumed that the contact-bridging member 172 opens when the speed of the vehicle reduces below sixty miles per hour, that the contact-bridging member 173 opens when the vehicle speed reduces below thirty-five miles per hour, and that the contact-bridging member 174 closes when the vehicle speed reduces to fifteen miles per hour, it will be evident that when the vehicle or train is traveling above sixty miles per hour, the high speed magnet 131 and the intermediate speed magnet 132 are energized, and the low speed magnet 133 is deenergized. It will also be apparent that if the vehicle is traveling in the range of speeds between thirty-five and sixty miles per hour, only the intermediate speed magnet 132 is energized. It will, furthermore, be evident that when the vehicle is traveling in the range of speeds between fifteen and thirty-five miles per hour, none of the magnet valve devices 131, 132 and 133 are energized. Finally, it will be evident that if the train is traveling at fifteen miles per hour or under, only the low speed magnet 133 is energized.

OPERATION OF EQUIPMENT (a) *Charging*

Assuming that the main reservoir 12 is charged to the normal pressure carried therein, as from a fluid compressor, not shown, that the vehicle is traveling along the road at a speed in excess of the certain uniform high speed of sixty miles per hour, and that the equipment is conditioned as shown in the drawing with the handle 25 of the brake valve device 13 in the release position, the chamber 57 of the pressure device 54 is at atmospheric pressure and consequently switch arm 71 of the pressure-responsive switch device 55 is in its upper position engaging contact finger 74 and thus the application and release magnet valve devices 16 and 17 are conditioned in the manner previously described to effect release of fluid under pressure from the straight-air pipe 15 and the connected brake cylinder 11. At the same time the pressure switch 21 is in circuit-opening position and all of the magnet valve devices 131, 132 and 133 of the control valve mechanism 18 are deenergized. Since the high speed magnet 131, the intermediate speed magnet 132 and the low speed magnet 133 are all deenergized, the chambers 124, 106 and 101 of the cylinder portion 52 of the control valve mechanism 18 are all vented to atmosphere and the fulcrum roller 84 carried on the shaft 87 is positioned midway between the stems 61 and 68 of the pressure devices 54 and 55.

(b) *Application of brakes*

If it is desired to effect an application of the brakes, under these conditions, the operator shifts the handle 25 of the brake valve device 13 to establish a pressure in the control pipe 14 and chamber 57 of the pressure device 54 corresponding to the desired degree of application of the brakes. Upon the supply of fluid under pressure to the chamber 57, switch arm 71 of the pressure-responsive switch device 55 is shifted out of engagement with the contact finger 74 and into engagement with the contact finger 76 in the manner previously described and the application and release magnet valve devices 16 and 17 are correspondingly conditioned to supply fluid under pressure to the straight-air pipe 15 and connected brake cylinder 11.

When the pressure in the brake cylinder 11 and straight-air pipe 15 exceeds a certain uniform low pressure such as two or three pounds per square inch, the pressure switch 21 is actuated to circuit-closing position and thus, under the conditions assumed, with the vehicle or train traveling in excess of sixty miles per hour, the high speed magnet 131 and the intermediate speed magnet 132 are energized. With the high speed magnet 131 and the intermediate speed magnet 132 energized, the exhaust communication for the chambers 124 and 104 is closed and communication is established through which fluid under pressure is supplied to the chambers 124 and 104 from the main reservoir pipe 26 so that the chambers 124 and 104 are charged to the pressure of the main reservoir pipe 26. The fluid pressure in the chamber 124 shifts the piston 88 and the shaft 87 against the resisting force of the spring 97 acting on the stop 95 and thus causes the fulcrum roller 84 to be shifted in the right-hand direction to a position determined by the engagement of the piston 88 with the gasket seat 113.

The piston stop element 94 is subject to the pressure in the chamber 104 and is also shifted in the right-hand direction into engagement with the gasket seat 123. The gasket seat 123 is a lesser distance from the piston element 94 compared to the distance of the gasket seat 113 from the piston 88, and thus the piston 88 disengages the end of the piston stop element 94 and continues further in the right-hand direction until seated on the gasket seat 113.

The gasket seat 113 may be so positioned as to limit the movement of the fulcrum roller 84 in the right-hand direction to a position so as to effect any desired ratio between the moment arm for the stem 61 of the pressure device 54 and the moment arm for the stem 68 of the pressure device 55. This ratio may be, for example, a ratio of four to one so that if the pressure established in control pipe 14 is, for example, seventy-five pounds per square inch, the pressure established in the straight-air pipe 15 will be three hundred pounds per square inch.

Since the condition of the magnet valve devices 131, 132 and 133 remains unchanged as long as the speed of the vehicle or train remains above the uniform high speed of sixty miles per hour, it will be apparent that the fulcrum roller 84 remains in the position to which it was initially shifted so that the highest ratio between the straight-air pipe pressure and the control pipe pressure is maintained as the vehicle reduces in speed towards the certain uniform speed of sixty miles per hour.

When the speed of the vehicle or train reduces below sixty miles per hour, due to the application of the brakes, and the contact member 172 of the governor switch device 119 is correspondingly shifted to circuit-opening position, the high speed magnet 131 is deenergized, and communication is thus established through which fluid under pressure is released from the chamber 124 at the left of the piston 88. The spring 97 accordingly becomes effective to shift the piston 89 and shaft 87 in the left-hand direction until the piston 88 engages the end of the piston stop element 94 which it will be recalled is held in seated engagement on the gasket seat 123 by the fluid pressure in chamber 104. The fulcrum roller 84 is correspondingly shifted in the left-hand direction back toward its neutral position and assumes a position corresponding to the position of the gasket seat 123 which may be positioned as desired to effect a desired ratio between the moment arm of the stem 61 of the pressure device 54 and the moment arm of the stem 68 of the pressure device 55. For example, the gasket seat 123 may be so located that when the piston 88 engages the end of the piston stop element 94, the fulcrum roller 84 is positioned so that moment arms of the stems 61 and 68 of the pressure devices 54 and 55 are in the ratio of three to one.

Thus, assuming that the pressure established in the control pipe 14 is maintained, the moment of force exerted on the lever 62 by the pressure of the fluid in the straight-air pipe 15 acting in the chamber 65 on the diaphragm 64 of the pressure device 55 overcomes the moment of force exerted on the lever 62 in the opposite direction by the pressure of the fluid in the control pipe 14 and chamber 57 of the pressure device 54 and causes the switch arm 71 to be shifted upwardly from the neutral or lap position thereof into engagement with the contact finger 74. The release magnet valve device 17 is thus energized and fluid under pressure released from the straight-air pipe 15 and brake cylinder 11 so that the degree of application of the brakes is thus reduced.

When the pressure of the fluid in the straight-air pipe 15 and chamber 65 in the pressure device 55 is reduced sufficiently that the moment of force exerted on the lever 62 by the stem 61 of the pressure device 54 slightly exceeds the moment of force exerted by the stem 68 of the pressure device 55, the switch arm 71 is shifted out of engagement with the contact finger 74. The release magnet valve device 17 is thus immediately deenergized and the release valve 39 immediately reseated to cut off the further exhaust of fluid under pressure from the straight-air pipe 15 and brake cylinder 11. Switch arm 71 is thus stopped in its neutral position between the contact fingers 74 and 75.

If it is assumed that a pressure of seventy-five pounds per square inch is initially established in the control pipe 14, it will be seen that, due to the change in the position of the fulcrum roller 84 automatically effected upon the reduction speed of the vehicle below the certain uniform high speed of sixty miles per hour, the pressure in the straight-air pipe 15 and brake cylinder 11 is automatically reduced. If as previously assumed, the new position of the fulcrum roller 84 is such as to effect a three-to-one ratio between the pressure in the straight-air pipe and the pressure in the control pipe, then the pressure in the straight-air pipe and brake cylinder is reduced to three times seventy-five pounds per square inch or two hundred twenty-five pounds per square inch.

Since the condition of the magnet valve devices 131, 132 and 133 remains unchanged as the vehicle or train reduces its speed from sixty miles per hour toward thirty-five miles per hour, it will be apparent that the brake cylinder pressure effective in this range of speed will reduce to and remain at the certain pressure determined by the pressure in the control pipe 14 and the position of the fulcrum roller 84.

It should be noted that the restricted passage 145 in the exhaust port 144 of high speed magnet 131 so controls the rate of exhaust of fluid under pressure from the chamber 124 that the position of the fulcrum roller 85 is changed in accordance with such rate of reduction and independently of the rate of reduction of speed of the vehicle. Thus the pressure in the straight-air pipe 15 and brake cylinder 11 is not reduced suddenly when the speed of the vehicle or train reduces below sixty miles per hour but rather at a predetermined rate such that the reduced pressure of two hundred twenty-five pounds per square inch is not attained until after the elapse of a certain interval of time following the reduction in the speed of the vehicle below the sixty miles per hour.

When the vehicle or train reduces in speed below the intermediate speed of thirty-five miles per hour and the contact-bridging member 173 of governor switch device 19 shifts to circuit-opening position, the deenergization of the intermediate speed magnet 132 effected thereby causes the fluid under pressure to be vented from the chamber 104 at the left of the piston stop element 94. Spring 97 acting on the stop element 95 accordingly becomes effective to shift the piston 89 and the shaft 87 in the left-hand direction against the reducing pressure in the chamber 104 and the force of the spring 106 to the position shown in the drawing, wherein the fulcrum roller 84 is positioned mid-way between the stems 61 and 68 of the pressure devices 54 and 55, so that the moment arms of the stems 61 and 68 are substantially equal.

In the manner previously described, the higher moment of force produced on the lever 62 by the pressure of the fluid in the straight-air pipe 15 causes the switch arm 71 to again be shifted upwardly and engage contact finger 74 to effect energization of the release magnet valve device 17 and the consequent further reduction of pressure in the straight-air pipe 15 and the brake cylinder 11.

With the fulcrum roller 84 positioned as shown mid-way between the stems 61 and 68, the pressure in the straight-air pipe 15 and the brake cylinder 11 will reduce until the moment of force on the lever 62 produced by the fluid pressure in control pipe 14 slightly exceeds the moment of force on the lever 62 produced by the fluid pressure in the straight-air pipe 15, at which time the switch arm 71 will be shifted downwardly out of engagement with the contact finger 74 to cause deenergization of the release magnet valve device 17 and consequent seating of the release valve 39 to cut off further exhaust from fluid under pressure from straight-air pipe 15 and brake cylinder 11.

Since the moment arms of the stems 61 and 68 of the pressure devices 54 and 55 are substantially equal when the fulcrum roller 84 is mid-way between the stems 61 and 68, it will be apparent that the pressure in the straight-air pipe will be reduced to a pressure corresponding substantially to the pressure established in the control pipe 14. Thus, if a pressure of seventy-five pounds per square inch remains established in the control pipe 14, the straight-air pipe pressure is reduced, at this time, to a minimum of substantially seventy-five pounds per square inch.

The restricted passage 145 in the exhaust port 144 of the intermediate speed magnet 132 so controls the rate of release of fluid under pressure from the chamber 104 that the pressure in the straight-air pipe 15 and brake cylinder 11 is not suddenly reduced but is reduced at a predetermined rate, the minimum pressure, here assumed as seventy-five pounds per square inch, not being attained until a predetermined time has elapsed after the speed of the train reduces below thirty-five miles per hour.

When the speed of the vehicle or train reduces to a predetermined low speed, such as fifteen miles per hour, and the contact-bridging member 174 of the governor switch device 19 engages the associated contact fingers 177 in circuit-closing relation, the low speed magnet 133 is energized and thus causes fluid under pressure to be supplied to the chamber 101 at the right of the piston 89. The pressure of the fluid supplied to the chamber 101 accordingly shifts the piston 89 and the shaft 87 in the left-hand direction until the piston 89 seats on the gasket seat 114 which is so located that the position of the fulcrum roller 84 corresponding thereto will effect a desired ratio between the moment arms of the stems 61 and 68 of the pressure devices 54 and 55, as for example, a ratio of two-to-three. Accordingly, due to the shift in the position of the fulcrum roller 84, the switch arm 71 of the pressure device 55 is again shifted upwardly to engage the contact finger 74 and effect energization of the release magnet valve device 17 so that fluid under pressure is again released from the straight-air pipe 15 and brake cylinder 11.

The pressure in the straight-air pipe 15 and brake cylinder 11 continues to be reduced until, with the fulcrum roller 84 in the position corresponding to the piston 89 in seated relation on the gasket seat 114, the moment of force on the lever 62 produced by the pressure in the control pipe 14 slightly exceeds the moment of force on the lever 62 produced by the pressure of the fluid in the straight-air pipe 15, at which time the switch arm 71 again is shifted downwardly out of engagement with the contact finger 74 to cause reseating of the release valve 39 and consequent cutting off of the further release of fluid under pressure from straight-air pipe 15 and brake cylinder 11. If as assumed, the moment arm of the stem 61 of the pressure device 54 is to the moment arm of the stem 68 of the pressure device 55 in the ratio of two-to-three, it will be seen that with a pressure of seventy-five pounds per square inch in the control pipe 15, a pressure of fifty pounds per square inch will be established in the straight-air pipe 15 and brake cylinder 11.

The restriction 150 in passage 151 leading to the chamber 101 so controls the rate of supply of fluid under pressure to chamber 101 that the piston 89, and accordingly the fulcrum roller 84, are shifted at a predetermined rate in the left-hand direction and do not arrive at the ultimate position determined by the engagement of the piston 89 with the gasket seat 114 until a predetermined time has elapsed following the reduction of the vehicle or train speed to fifteen miles per hour.

It will thus be seen that as the vehicle or train reduces in speed from fifteen miles per hour, brake cylinder pressure is reduced to a minimum value in accordance with the extreme left-hand position of fulcrum roller 84.

When the vehicle or train is completely stopped, the minimum straight-air pipe and brake cylinder pressure thus attained is maintained as long as the pressure established in the control pipe 14 is maintained. If the vehicle or train stops on a grade and the operator desires to increase the brake cylinder pressure to hold the vehicle or train against creepage on a grade, he may operate the handle 25 of the brake valve device 13 to increase the pressure in the control pipe 14 to a desired degree. For example, assuming that the position of the fulcrum roller 84 is such as to effect a two-to-three ratio between the pressure in the straight-air pipe and the pressure in the control pipe, the operator may increase the pressure in the control pipe 14 to one hundred pounds per square inch, whereupon the pressure in the straight-air pipe 15 and brake cylinder 11 is increased to substantially 67 pounds per square inch.

(c) Release of brakes

If the operator desires to have the vehicle or train again proceed, he may effect release of the brakes by shifting the handle of the brake valve device 13 to release position to reduce the pressure in the control pipe 14 to atmospheric pressure. The higher pressure in the straight-air pipe 15 accordingly exerts a higher moment of force on the lever 62 than does the reducing pressure in the control pipe 14, and the switch arm 71 is thus correspondingly shifted upwardly into engagement with the contact finger 74 to effect energization of the release magnet 17 and the consequent release of the fluid under pressure from the straight-air pipe 15 and brake cylinder 11. When the pressure in the control pipe 14 is reduced to atmospheric pressure, the return spring 73 maintains the switch arm 71 in its upper position in engagement with the contact finger 74 to maintain the release magnet valve device 17 energized so that the pressure in the straight-air pipe 15 and brake cylinder 11 is also reduced to atmospheric pressure.

When the pressure in the straight-air pipe 15 reduces below a predetermined low pressure, for example two or three pounds per square inch, the pressure switch 21 is shifted to circuit-opening position, thus effecting deenergization of the low speed magnet 133. Fluid under pressure is thus exhausted from the chamber 101 under the control of the low speed magnet 133, and the spring 106 acting on the piston stop element 94 becomes effective to shift piston 88 and shaft 87 in the righthand direction until the piston 89 reengages the stop element 95, at which time further movement of the shaft 87 ceases. Thus, when the brakes are released, the fulcrum roller 87 is automatically restored to its neutral position shown in the drawing and mid-way between the stems 61 and 68 of the pressure devices 54 and 55.

It will be understood that the operator retains control of the brakes at all times, independently of the control exercised by the governor switch device 19, because the operator may vary the pressure in the control pipe 14 during an application of the brakes to correspondingly vary the pressure in straight-air pipe 15 and brake cylinder 11. It will be understood that the governor switch device 19 together with the control valve mechanism 18 merely controls the ratio between the pressure established in the control pipe 14 and that in the straight-air pipe 15.

It will be apparent that in the event an application of the brakes is initiated while the vehicle or train is traveling in the range of speeds between thirty-five and sixty miles per hour, the maximum ratio between the pressure established in the straight-air pipe and the pressure established in the control pipe will not be attained but that the next lower ratio will be initially effective. It will also be apparent that, in such case, the ratio will thereafter be successively reduced in the manner previously described.

Likewise, if the application of the brakes is initiated while the vehicle or train is traveling within the range of speeds between fifteen and thirty-five miles per hour, the maximum initial ratio between the straight-air pipe pressure and control pipe pressure corresponds to the particular speed range. Similarly, if the application of the brakes is initiated while the vehicle or train is traveling at a speed below fifteen miles per hour, the initial and also the final ratio between the straight-air pipe pressure and the control pipe pressure will be the minimum ratio.

It will be understood that the specific train speeds referred to in connection with the operation of the governor switch device 19, the specific fluid pressures in the straight-air pipe and in the control pipe, as well as the specific ratios of the moment arms on the lever 62 dependent upon the position of the fulcrum roller 84, are merely illustrative and that any desired speeds, pressures, or ratios may be employed.

APPLICATION OF INVENTION TO A TRAIN BRAKE EQUIPMENT

For simplicity, I have illustrated my invention in connection with an equipment employing a single brake cylinder. It will be apparent to anyone skilled in the art, however, that my invention is adapted to be embodied in a train brake equipment. In such case, the various brake cylinders will be connected at intervals along the length of the straight-air pipe 15, which extends throughout the train, and a plurality of sets of application and release magnet valve devices corresponding to the application and release magnet valve devices 16 and 17 will be connected to the application train wire 77 and release train wire 75 in the manner indicated for the application and release magnet valve devices 16 and 17, respectively, so that fluid under pressure will be supplied to and released from the straight-air pipe 15 at intervals along the straight-air pipe, whereby any substantial gradient in the straight-air pipe 15 will be avoided and whereby variation of the pressure in the straight-air pipe will be effected uniformly along the length thereof.

While I have indicated the main reservoir pipe 26 as being the source of fluid pressure from which fluid under pressure is supplied to straight-air pipe 15 under the control of the application and release magnet valve devices 16 and 17, it will be understood that such construction is for simplicity only and that in practice, local reservoirs will be provided along the length of the train on the various cars which will be adapted to be charged in a suitable manner and which will serve as the source of fluid under pressure controlled by the plurality of sets of application and release magnet valve devices 16 and 17. Thus an adequate supply of fluid under pressure will be immediately available at all points along the length of the train.

Furthermore, while I have shown only one governor switch device 19, as a practical manner, two or more governor switch devices associated with different wheel axles and having the contact members thereof connected in parallel relation will be provided to guard against undesired reduction in the degree of the application of all the brake cylinders on the train in the event that the wheels of the axle with which a particular governor switch device is associated might slip.

SUMMARY

Summarizing, it will be seen that I have provided an equipment adapted to control the degree of application of the brakes on a vehicle or train automatically according to the speed of travel thereof. The equipment includes a fluid pressure differential responsive device including a pivoted lever, subject in opposing relation to a control pressure and a supply pressure and operative to control the degree of the supply pressure in varying ratio to the control pressure dependent upon the position of a movable fulcrum for the pivoted lever.

The position of the movable fulcrum corresponds to the position of a movable abutment which is shifted to a plurality of certain different uniform positions by variations of fluid pressure acting on the abutment. A plurality of electromagnetically operated valves which are controlled automatically by a governor switch device operated according to the speed of travel of the vehicle or train serve to control the fluid pressure on the abutment. The movable abutment is normally yieldingly biased to a certain position and is shiftable from the certain position to an extreme position in one direction and to an extreme position in the opposite direction. A separate movable abutment is selectively subjected to fluid under pressure under the control of one of the electromagnet valve devices and thereby positioned to stop movement of the movable abutment controlling the position of the movable fulcrum in the opposite direction from the normal position in advance of the extreme position in the said opposite direction.

While I have shown and described but one specific embodiment of my invention, it will be apparent that various omissions, additions, or modifications may be made in the embodiment shown without departing from the spirit of my invention. It is, accordingly, not my intention to limit the scope of the present invention except as it is necessitated by the scope of the prior art.

Having now described my invention, what I claim as new and desire to secure by Letters Patent, is:

1. In a vehicle brake system, brake control means including a pivoted lever subject to the opposing moments exerted by a control pressure and a supply pressure which determines the degree of application of the brakes, a fulcrum for said lever arranged to move to different positions to cause variations in the ratio between the control pressure and the supply pressure, means providing a chamber, a movable abutment shifted to different positions according to the pressure in the said chamber for correspondingly shifting the said fulcrum, a valve device for controlling the supply of fluid under pressure to and the release of fluid under pressure from said chamber, and independent means for timing the rate of release of fluid under pressure from said chamber.

2. In a vehicle brake system, brake control means including a pivoted lever subject to the opposing moments exerted by a control pressure and a supply pressure which determines the degree of application of the brakes, a fulcrum for said lever movable to different positions for varying the ratio between the control pressure and the supply pressure, means providing a chamber adapted to be charged with fluid at a pressure in excess of a certain pressure, a movable abutment shiftable to a certain uniform position when said chamber is charged with fluid at a pressure in excess of said certain pressure for correspondingly positioning the said fulcrum, a valve device for controlling the supply of fluid under pressure to and the release of fluid under pressure from the said chamber, independent means for timing the rate of release of fluid under pressure from said chamber, said abutment being shiftable from said certain position according to the rate of reduction of the pressure in said chamber to correspondingly shift said fulcrum.

3. In a vehicle brake system, brake control means including a pivoted lever subject to the opposing moments exerted by a control pressure and a supply pressure which determines the degree of application of the brakes, a fulcrum for said lever arranged to move to different positions to cause variations in the ratio between the control pressure and the supply pressure, means providing a chamber adapted to have fluid under pressure supplied thereto and released therefrom, a movable abutment shiftable in one direction upon an increase of pressure in said chamber toward an extreme position to correspondingly position the said fulcrum and shiftable in the reverse direction toward an extreme position upon a reduction of pressure in said chamber, and means selectively effective to limit the movement of the said abutment in the reverse direction to a position in advance of the extreme position in the said reverse direction.

4. In a vehicle brake system, brake control means including a pivoted lever subject to the opposing moments exerted by a control pressure and a supply pressure which determines the degree of application of the brakes, a fulcrum for said lever arranged to move to different positions to cause variations in the ratio between the control pressure and the supply pressure, means providing a chamber adapted to have fluid under pressure supplied thereto and released therefrom, a movable abutment shiftable in one direction upon an increase of pressure in said chamber toward an extreme position to correspondingly position the said fulcrum and shiftable in the reverse direction toward an extreme position upon a reduction of pressure in said chamber, means providing a second chamber adapted to be charged with fluid under pressure, and a movable abutment shiftable to a certain position when said second chamber is charged with fluid under pressure for limiting the movement of the first said abutment in the reverse direction to a position in advance of the extreme position in the reverse direction.

5. In a vehicle brake system, brake control means including a pivoted lever subject to the opposing moments exerted by a control pressure and a supply pressure which determines the degree of application of the brakes, a fulcrum for said lever arranged to move to different positions to cause variations in the ratio between the control pressure and the supply pressure, means providing a chamber adapted to have fluid under pressure supplied thereto and released therefrom, a movable abutment shiftable in one direction upon an increase of pressure in said chamber toward an extreme position to correspondingly position the said fulcrum and shiftable in the reverse direction toward an extreme position upon a reduction of pressure in said chamber, means providing a second chamber adapted to be charged with fluid under pressure, a movable abutment shiftable to a certain position when said second chamber is charged with fluid under pressure for limiting the movement of the first said abutment in the reverse direction to a position in advance of the extreme position in the reverse direction, and means for controlling a supply of fluid under pressure to and the release of fluid under pressure from the said second chamber.

6. In a vehicle brake system, brake control means including a pivoted lever subject to the opposing moments exerted by a control pressure and a supply pressure which determines the degree of application of the brakes, a fulcrum for said lever arranged to move to different positions to cause variations in the ratio between the control pressure and the supply pressure, means providing a chamber adapted to have fluid under pressure supplied thereto and released therefrom, a movable abutment shiftable in one direction upon an increase of pressure in said chamber toward an extreme position to correspondingly position the said fulcrum and shiftable in the reverse direction toward an extreme position upon a reduction of pressure in said chamber, means providing a second chamber adapted to be charged with fluid under pressure, a movable abutment shiftable to a certain position when said second chamber is charged with fluid under pressure for limiting the movement of the first said abutment in the reverse direction to a position in advance of the extreme position in the reverse direction, means for controlling a supply of fluid under pressure to and the release of fluid under pressure from the said second chamber, and independent means for timing the rate of release of fluid under pressure from said second chamber.

7. In a vehicle brake system, brake control means including a pivoted lever subject to the opposing moments exerted by a control fluid pressure variable in degree and a supply fluid pressure which varies according to variations in the control fluid pressure and determines the degree of application of the brakes, a fulcrum for said lever movable to different positions to correspondingly vary the ratio between the control pressure and the supply pressure, means providing a chamber, means controlled according to the speed of the vehicle for controlling the pressure in said chamber, and a movable abutment shiftable to different positions according to the pressure in said chamber for correspondingly shifting said fulcrum.

8. In a vehicle brake system, brake control means including a pivoted lever subject to the opposing moments exerted by the control pressure and a supply pressure which determines the degree of application of the brakes, a fulcrum for said lever movable to different positions to correspondingly vary the ratio between the control pressure and the supply pressure, means providing a chamber, a valve device operative to supply fluid under pressure to said chamber as long as the vehicle exceeds a certain uniform speed and operative to effect release of the fluid under pressure from said chamber when the vehicle reduces in speed below said uniform speed, a movable abutment shiftable to different positions according to the pressure in said chamber for correspondingly shifting said fulcrum, and independent means for timing the rate of release of fluid under pressure from said chamber.

9. In a vehicle brake system, brake control means including a pivoted lever subject to the opposing moments exerted by a control pressure and a supply pressure which determines the degree of application of the brakes, a fulcrum for said lever arranged to move to different positions to cause variations in the ratio between the control pressure and the supply pressure, means providing a chamber adapted to have fluid under pressure supplied thereto and released therefrom, a movable abutment shiftable in one direction upon an increase of pressure in said chamber toward an extreme position to correspondingly position the said fulcrum and shiftable in the reverse direction toward an extreme position upon a reduction of pressure in said chamber, means providing a second chamber adapted to be charged with fluid under pressure, a movable abutment shiftable to a certain position when said second chamber is charged with fluid under pressure for limiting the movement of the first said abutment in the reverse direction to a position in advance of the extreme position in the reverse direction, and means controlled according to a variable operating condition of the vehicle for controlling the supply of fluid under pressure to and the release of fluid under pressure from said two chambers.

10. In a vehicle brake system, brake control means including a pivoted lever subject to the opposing moments exerted by a control pressure and a supply pressure which determines the degree of application of the brakes, a fulcrum for said lever arranged to move to different positions to cause variations in the ratio between the control pressure and the supply pressure, means providing a chamber adapted to have fluid under pressure supplied thereto and released therefrom, a movable abutment shiftable in one direction upon an increase of pressure in said chamber toward an extreme position to correspondingly position the said fulcrum and shiftable in the reverse direction toward an extreme position upon a reduction of pressure in said chamber, means providing a second chamber adapted to be charged with fluid under pressure, a movable abutment shiftable to a certain position when said second chamber is charged with fluid under pressure for limiting the movement of the first said abutment in the reverse direction to a position in advance of the extreme position in the reverse direction, and means controlled according to the speed of the vehicle for controlling the supply of fluid under pressure to and the release of fluid under pressure from said two chambers.

11. In a vehicle brake system, brake control means including a pivoted lever subject to the opposing moments exerted by a control pressure and a supply pressure which determines the degree of application of the brakes, a fulcrum for said lever arranged to move to different positions to cause variations in the ratio between the control pressure and the supply pressure, means providing a chamber adapted to have fluid under pressure supplied thereto and released therefrom, a movable abutment shiftable in one direction upon an increase of pressure in said chamber toward an extreme position to correspondingly position the said fulcrum and shiftable in the reverse direction toward an extreme position upon a reduction of pressure in said chamber, means providing a second chamber adapted to be charged with fluid under pressure, a movable abutment shiftable to a certain position when said second chamber is charged with fluid under pressure for limiting the movement of the first said abutment in the reverse direction to a position in advance of the extreme position in the reverse direction, and means controlled according to a variable operating condition of the vehicle for effecting a reduction of the pressure in the first said chamber and then a reduction of the pressure in the said second chamber.

12. In a vehicle brake system, brake control means including a pivoted lever subject to the opposing moments exerted by a control pressure and a supply pressure which determines the degree of application of the brakes, a fulcrum for said lever arranged to move to different positions to cause variations in the ratio between the control pressure and the supply pressure, means providing a chamber adapted to have fluid under pressure supplied thereto and released therefrom, a movable abutment shiftable in one direction upon an increase of pressure in said chamber toward an extreme position to correspondingly position the said fulcrum and shiftable in the reverse direction toward an extreme position upon a reduction of pressure in said chamber, means providing a second chamber adapted to be charged with fluid under pressure, a movable abutment shiftable to a certain position when said second chamber is charged with fluid under pressure for limiting the movement of the first said abutment in the reverse direction to a position in advance of the extreme position in the reverse direction, and means controlled according to the speed of the vehicle for effecting reduction of the pressure in the first said chamber and then reduction of the pressure in the said second chamber.

13. In a vehicle brake system, brake control means including a pivoted lever subject to the opposing moments exerted by a control pressure and a supply pressure which determines the degree of application of the brakes, a fulcrum for said lever arranged to move to different positions to cause variations in the ratio between the control pressure and the supply pressure, means providing a chamber adapted to have fluid under pressure supplied thereto and released therefrom, a movable abutment shiftable in one direction upon an increase of pressure in said chamber toward an extreme position to correspondingly position the said fulcrum and shiftable in the reverse direction toward an extreme position upon a reduction of pressure in said chamber, means providing a second chamber adapted to be charged with fluid under pressure, a movable abutment shiftable to a certain position when said second chamber is charged with fluid under pressure for limiting the movement of the first said abutment in the reverse direction to a position in advance of the extreme position in the reverse direction, valve means operative to charge the first said chamber with fluid under pressure as long as the vehicle exceeds a certain uniform speed and operative when the vehicle reduces below said certain uniform speed to effect reduction of the pressure in said first chamber, and valve means operative to charge said second chamber with fluid under pressure as long as the vehicle exceeds a second certain uniform speed lower than the first said uniform speed and operative to effect release of fluid under pressure from said second chamber when the vehicle reduces in speed below the said second uniform speed.

14. In a vehicle brake system, brake control means including a pivoted lever subject to the opposing moments exerted by a control pressure and a supply pressure which determines the degree of application of the brakes, a fulcrum for said lever movable to different positions from a certain position to correspondingly vary the ratio between the control pressure and the supply pressure, means providing a first chamber, means providing a second chamber, a movable abutment shiftable in one direction to correspondingly shift the said fulcrum when the first said chamber is charged with fluid under pressure and shiftable in the opposite direction to correspondingly shift said fulcrum from said certain position when the said second chamber is charged with fluid under pressure, and means controlled according to a variable operating condition of the vehicle for effecting in succession the charging of said first chamber with fluid under pressure, the release of fluid under pressure from said first chamber, and the charging of said second chamber with fluid under pressure.

15. In a vehicle brake system, brake control means including a pivoted lever subject to the opposing moments exerted by a control pressure and a supply pressure which determines the degree of application of the brakes, a fulcrum for said lever movable to different positions from a certain position to correspondingly vary the ratio between the control pressure and the supply pressure, means providing a first chamber, means providing a second chamber, a movable abutment shiftable in one direction to correspondingly shift the said fulcrum when the first said chamber is charged with fluid under pressure and shiftable in the opposite direction to correspondingly shift said fulcrum from said certain position when the said second chamber is charged with fluid under pressure, and means controlled according to the speed of the vehicle for controlling the supply of fluid under pressure to and the release of fluid under pressure from said first and said second chambers.

16. In a vehicle brake system, brake control means including a pivoted lever subject to the opposing moments exerted by a control pressure and a supply pressure determining the degree of application of the brakes, a fulcrum for said lever movable to different positions to correspondingly vary the ratio between the control pressure and the supply pressure, a movable abutment adapted to cause movement of the said fulcrum to different positions corresponding to the position of the abutment, resilient yielding means normally effective to maintain said abutment in a certain uniform position, a fixed stop element for limiting movement of said abutment in one direction from said certain position, a second fixed stop element for limiting the movement of the abutment in the opposite direction from said certain position, and means controlled according to a variable operating condition of the vehicle for controlling the fluid pressure acting on said abutment to cause movement thereof in either direction.

17. In a vehicle brake system, in combination, means for establishing a control fluid pressure, switch means operably responsive to said control pressure for establishing a brake applying fluid pressure, and means governed by the speed of the vehicle and operating upon said switch means to determine the relation between said two pressures.

18. In a vehicle brake system, in combination, means for establishing a control fluid pressure, switch means operably responsive to said control pressure for establishing a brake applying fluid pressure, and means adjustable in response to a variable operating condition of the vehicle for variably conditioning said switch means so that it is effective to establish a plurality of different brake applying pressures in response to a given control pressure.

ELLIS E. HEWITT.